United States Patent
Lee et al.

(10) Patent No.: US 10,879,502 B2
(45) Date of Patent: Dec. 29, 2020

(54) ELECTRODE ASSEMBLY COMPRISING REINFORCING MEMBER CAPABLE OF MINIMIZING DEFORMATION OF ELECTRODE AND STACKED STRUCTURE OF UNIT CELL BY PROTECTING UNIT CELL FROM EXTERNAL IMPACT

(71) Applicant: LG Chem, Ltd., Daejeon (KR)

(72) Inventors: Jeong Woo Lee, Daejeon (KR); Chan Ki Park, Daejeon (KR)

(73) Assignee: LG Chem, Ltd.

( * ) Notice: Subject to any disclaimer, the term of this patent is extended or adjusted under 35 U.S.C. 154(b) by 245 days.

(21) Appl. No.: 15/718,519

(22) Filed: Sep. 28, 2017

(65) Prior Publication Data

US 2018/0102512 A1 Apr. 12, 2018

(30) Foreign Application Priority Data

Oct. 6, 2016 (KR) .................. 10-2016-0129232

(51) Int. Cl.
| | | |
|---|---|---|
| *H01M 10/0583* | (2010.01) | |
| *H01M 10/058* | (2010.01) | |
| *H01M 2/00* | (2006.01) | |
| *H01M 2/18* | (2006.01) | |
| *H01M 2/02* | (2006.01) | |
| *H01M 10/42* | (2006.01) | |
| *H01M 2/26* | (2006.01) | |
| *H01M 10/04* | (2006.01) | |

(52) U.S. Cl.
CPC ....... *H01M 2/0267* (2013.01); *H01M 2/0285* (2013.01); *H01M 2/0287* (2013.01); *H01M 2/18* (2013.01); *H01M 2/26* (2013.01); *H01M 10/0459* (2013.01); *H01M 10/4235* (2013.01)

(58) Field of Classification Search
None
See application file for complete search history.

(56) References Cited

U.S. PATENT DOCUMENTS

| 9,203,117 B2 | 12/2015 | Guen | |
|---|---|---|---|
| 2010/0310930 A1* | 12/2010 | Park | B32B 15/08 |
| | | | 429/185 |
| 2014/0099525 A1* | 4/2014 | Kwon | H01M 10/04 |
| | | | 429/94 |

FOREIGN PATENT DOCUMENTS

| KR | 2008-0010735 A | 1/2008 |
|---|---|---|
| KR | 10-2013-0124189 A | 11/2013 |
| KR | 10-2015-0038931 A | 4/2015 |
| KR | 10-2015-0083521 A | 7/2015 |

* cited by examiner

*Primary Examiner* — Yoshitoshi Takeuchi
(74) *Attorney, Agent, or Firm* — Lerner, David, Littenberg, Krumholz & Mentlik, LLP

(57) ABSTRACT

The present disclosure provides an electrode assembly including a unit cell stack having n unit cells stacked with a separation film interposed therebetween and at least one reinforcing member formed from metal that integrally covers at least one of the upper and lower surfaces and at least one side surface of the unit cell stack. In particular, n is an odd number excluding 1. Additionally, in each unit cell, one or more cathodes and one or more anodes are stacked with a separator interposed therebetween. Accordingly, the unit cells are protected against external impacts.

18 Claims, 7 Drawing Sheets

ELECTRODE ASSEMBLY COMPRISING REINFORCING MEMBER CAPABLE OF MINIMIZING DEFORMATION OF ELECTRODE AND STACKED STRUCTURE OF UNIT CELL BY PROTECTING UNIT CELL FROM EXTERNAL IMPACT

CROSS-REFERENCE TO RELATED APPLICATION

This application claims priority to and the benefit of Korean Patent Application No. 2016-0129232, filed on Oct. 6, 2016, the disclosure of which is incorporated herein by reference in its entirety.

TECHNICAL FIELD

The present disclosure relates to an electrode assembly having a reinforcing member and more particularly, a reinforcing member capable of minimizing deformation of the electrodes and the stacked structure of unit cells by protecting the unit cells from external impacts.

RELATED ART

Recently, mobile devices technology has continued to develop and the demand for the mobile devices has continued to increase and the demand for secondary batteries as energy sources has rapidly increased. Accordingly, research on secondary batteries (e.g., battery cells) that satisfy various needs has been conducted. Battery cells may be classified according to the shape of the battery case and include a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case formed from an aluminum laminate sheet.

Additionally, battery cells are classified according to the structure of electrode assembly including a cathode, an anode, and a separator. For example, the electrode assembly may be configured to have a layer spiral arrangement (e.g., jelly-roll wound) type structure having long-sheet type cathodes and long sheet type anodes wound with separators disposed respectively between the cathodes and the anodes, a stacked type structure in which pluralities of cathodes and anodes each having a predetermined size, are sequentially stacked with separators disposed respectively between the cathodes and the anodes, a stacked/folded type structure having cathodes and anodes each with a predetermined size sequentially stacked with separators disposed respectively between the cathodes and the anodes to constitute a unit cell, such as a bi-cell or a full cell. Then, unit cells are wound to dispose the the unit cells on a separation film, or another stacked type electrode assembly in which bi-cells or full cells are stacked in a state in which separators are disposed respectively between the bi-cells or the full cells.

Recently, significant interest has been directed to battery cells including an electrode assembly that includes bi-cells or full cells, which are easy to manufacture, have low manufacturing costs, and have high structural applicability in response to various shapes of a device. However, the electrode assembly includes unit cells such as bi-cells or full cells having a plurality of electrodes are stacked and have stacked unit cells. Accordingly, the stacked structure may be distorted by an external impact. In particular, the stacked structure of the electrodes of each unit cell is distorted. Deformation of the stacked structure impedes the electrochemical reaction of the electrodes or the unit cells and increases an internal resistance and generates heat.

Further, when an external impact deforms or breaks the electrode a rapid increase in resistance and a generation of heat occurs, which creates serious safety problems (e.g., ignition and explosion). In addition, the electrode assembly is vulnerable to external impacts caused by needle-shaped conductors (e.g., nails). Specifically, when a sharp needle-shaped conductor having electrical conductivity (e.g., a nail), penetrates into the electrode assembly, the cathode and anode thereof are electrically connected to each other by the needle-shaped conductor, resulting in conduction of current to the needle-shaped conductor, which has a low resistance.

Accordingly, the electrode through which the needle-shaped conductor has penetrated is deformed. Additionally, high resistance heat is generated due to the conducting current in a contact resistance portion between the cathode active material and the anode active material. When the temperature in the electrode assembly exceeds a critical temperature level due to the heat, the oxide structure of the cathode active material collapses and a thermal runaway phenomenon occurs. This may become a significant cause of ignition or explosion of the electrode assembly or battery cell.

Furthermore, when the electrode active material or the current collector bent by the needle-shaped conductor contacts the opposite electrode that the electrode active material or the current collector faces, it generates heat higher than the resistance heat, which further accelerates the thermal runaway phenomenon. These problems are more serious in a bi-cell having a plurality of electrodes and an electrode assembly including the same. Consequently, Consequently, there is a significant need for an electrode assembly having that protects unit cells and each electrode against various external impact factors.

The above information disclosed in this section is merely for enhancement of understanding of the background of the disclosure and therefore it may contain information that does not form the prior art that is already known in this country to a person of ordinary skill in the art.

SUMMARY

The present disclosure provides an electrode assembly that includes a reinforcing member capable of minimizing the deformation of the electrodes and the stacked structure of unit cells by protecting the unit cells from external impacts.

In an aspect of the disclosure, the electrode assembly of the present disclosure may include a unit cell stack having n unit cells that are stacked with a separation film interposed therebetween and at least one reinforcing member formed from metal and integrally covers at least one of the upper and lower surfaces and at least one side surface of the unit cell stack to protect the unit cells against external impacts. In particular, n may be an odd number excluding 1 and in each unit cell, one or more cathodes and one or more anodes may be stacked with a separator interposed therebetween In an exemplary embodiment, the electrode assembly may include a structure having the separation film wound from the first unit cell to the $n^{th}$ unit cell to form a unit cell stack in which the $n^{th}$ unit cell and the $(n-1)^{th}$ unit cell are disposed at the uppermost and lowermost ends, respectively; and the separation film and the first reinforcing member are wound on the unit cell stack to cover one side surface, the upper surface and the lower surface of the unit cell stack by the first reinforcing member. In particular, the first reinforcing member may be bent in response to winding and integrally cover the upper surface, the lower surface, and one side surface of the unit cell stack.

In some exemplary embodiments, the first reinforcing member together with the separation film may cover one side surface of the unit cells. Further, the first reinforcing member may cover the upper surface of the unit cell stack when disposed opposite to the outermost electrode of the $n^{th}$ unit cell disposed at the uppermost end of the unit cell stack. In other exemplary embodiments, the first reinforcing member may cover the lower surface of the unit cell stack when disposed opposite the outermost electrode of the $(n-1)^{th}$ unit cell disposed at the lowermost end of the unit cell stack. However, in the above structure, the electrodes of the first unit cell and the $(n-1)^{th}$ unit cell facing the first reinforcing member may have the same polarity as each other, and the electrodes of the same polarity may be electrically connected by the first reinforcing member.

In other exemplary embodiments, the first reinforcing member may include an insulating material such as a fluorine resin and an enamel resin disposed on the surface opposite to a surface that abuts the separation film, to provide insulation against the electrodes of the unit cells. In another exemplary embodiment, the electrode assembly may include a structure having a second reinforcing member disposed proximate to the first reinforcing member and the separation film may be wound to stack the unit cells. In some exemplary embodiments, the electrode assembly may include a structure having the separation film wound from the first unit cell to the $n^{th}$ unit cell to form a unit cell stack in which the $n^{th}$ unit cell and the $(n-1)^{th}$ unit cell are disposed at the uppermost and lowermost ends, respectively The separation film and the first reinforcing member may be wound on the unit cell stack and the first reinforcing member may cover one side surface and the upper and lower surfaces of the unit cell stack. The second reinforcing member and the separation film may be wound on the unit cell stack to cover the other side (e.g., second side) surface of the unit cell stack and the first reinforcing member portion that covers and the upper and lower surfaces of the unit cell stack.

In other exemplary embodiments, the first reinforcing member and the second reinforcing member may cover both side surfaces of the electrode assembly to firmly fix the stacked structure. Additionally, since the upper surface or the lower surface of the unit cell stack may be covered by two layers, the first reinforcing member and the second reinforcing member, these portions may be more effectively protected from external impacts caused by a needle-shaped conductor. In particular, when both the first reinforcing member and the second reinforcing member are included in the electrode assembly, the second reinforcing member may be made of a metal material different from the metal constituting the first reinforcing member.

In another exemplary embodiment, the electrode assembly may have a structure where a reinforcing member unit, in which the second reinforcing member is stacked on the first reinforcing member, may be disposed proximate to the $n^{th}$ unit cell and the separation film may be wound to stack the unit cells. In particular, the separation film may be wound from the first unit cell to the $n^{th}$ unit cell to form a unit cell stack in which the $n^{th}$ unit cell and the $(n-1)^{th}$ unit cell are disposed at the uppermost and lowermost ends, respectively. The separation film and the reinforcing member unit may be wound on the unit cell stack and may enable the first reinforcing member and the second reinforcing member to cover one side surface and the upper and lower surfaces of the unit cell stack.

In other exemplary embodiments the side surface and the upper and lower surfaces of the electrode assembly may be covered by two layers, the first reinforcing member and the second reinforcing member, and the portions may be more effectively protected from external impacts caused by a needle-shaped conductor.

In an exemplary embodiment, the first reinforcing member may have a pair of fixing tabs formed therein, which are connected to the cathode tabs or anode tabs of the unit cells which have the same polarity as the fixing tabs to fix the reinforcing member. In particular, one of the fixing tabs may be connected to the cathode tabs or the anode tabs formed in the $n^{th}$ unit cell and the other may be connected to the cathode tabs or the anode tabs formed in the $(n-1)^{th}$ unit cell. Similarly, the second reinforcing member may have a pair of fixing tabs formed therein, which are connected to the cathode tabs or anode tabs of the unit cells which have the same polarity as the fixing tabs to fix the reinforcing member. In addition, one of the fixing tabs may be connected to the cathode tabs or the anode tabs formed in the $n^{th}$ unit cell and the other may be connected to the cathode tabs or the anode tabs formed in the $(n-1)^{th}$ unit cell. In some exemplary embodiments, the fixing tabs of the second reinforcing member may be connected to the fixing tabs of the first reinforcing member.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Figure 1:
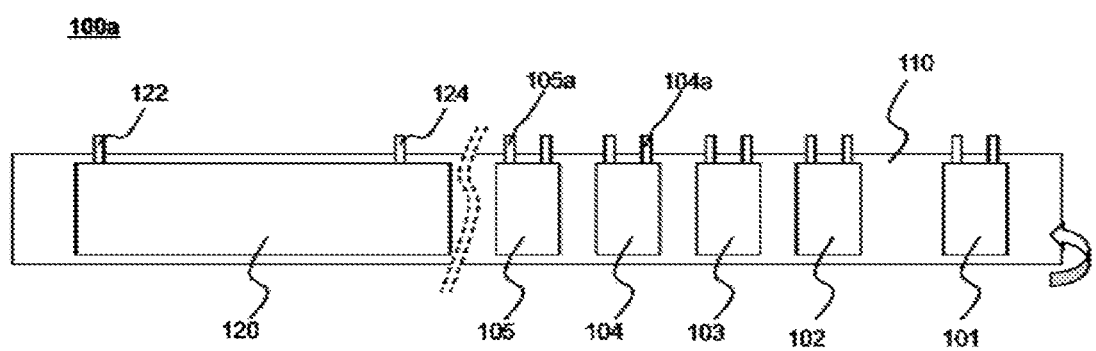
FIG. 1 to FIG. 3 are exemplary diagrams of an electrode assembly according to a first exemplary embodiment of the present disclosure

Hereinafter, embodiments of the present disclosure will be described with reference to the accompanying drawings. However, the description provided herein is for better understanding of the present disclosure, and the scope of the present disclosure is not limited thereto. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In an exemplary embodiment, the electrode assembly of the present disclosure may include a unit cell stack having n unit cells that are stacked with a separation film interposed therebetween and at least one reinforcing member formed from metal and integrally covers at least one of the upper and lower surfaces and at least one side surface of the unit cell stack to protect the unit cells against external impacts. In particular, n may be an odd number excluding 1 and in each unit cell, one or more cathodes and one or more anodes may be stacked with a separator interposed therebetween.

In some exemplary embodiments, the electrode assembly according to the present disclosure may include structure in which a reinforcing member made of metal protects unit cells from external impacts to minimize the deformation of the stacked structure of the unit cells or electrodes and the deformation of the electrodes. In addition, when the electrode assembly is impacted by a needle-shaped conductor (e.g., a nail), the reinforcing member inhibits its penetration into the electrode assembly, thereby improving the safety of the electrode assembly. In addition, even when a needle-shaped conductor completely penetrates through the electrode assembly, the metallic reinforcing member first contacts the needle-shaped conductor to conduct a current thereby creating a short circuit. Nevertheless, since the reinforcing member is not coated with an electrode active material, the amount of heat generated by the short circuit is relatively very low. Accordingly, the safety of the battery is improved.

In the present disclosure, each of the unit cells may include a full cell structure having a cathode, a separator, and an anode that are sequentially stacked, an A-type bi-cell structure in which a cathode, a separator, an anode, a separator and a cathode are sequentially stacked, or a C-type bi-cell structure in which an anode, a separator, a cathode, a separator and an anode are sequentially stacked. In these unit cell structures, the contacting surfaces between the separators and the electrodes may be laminated so that the separators and the electrodes are joined to each other. In some cases, the separators and the electrodes may be stacked without lamination.

Further, an additional separator may be stacked or laminated on the outermost surface of the outermost electrode of the unit cell. The reinforcing member may be made of at least one metal selected from the group consisting of copper, aluminum, nickel, iron, and lead, but the material of the reinforcing member is not limited thereto. Further, the reinforcing member may be a metal plate having a thickness of about 0.1 mm or greater and less than about 1 mm; or a metal thin film having a thickness of about 0.01 mm or greater and less than about 0.1 mm.

Since the metal plate has a relatively large thickness, it is excellent in mechanical rigidity and thus may perform as a skeleton that maintains the stacked structure of unit cells or electrodes even upon an external impact. Accordingly, the electrode assembly may be protected. Conversely, the metal thin film, does not increase the size of the electrode assembly. Additionally, damage caused by a needle-shaped conductor may be prevented which is advantageous in forming a thin film electrode assembly. Further, the metal thin film, covers the unit cell stack to fix the stacked shape of the unit cells or electrodes and inhibits the deformation thereof due to an external impact.

When the thickness of the reinforcing member is less than the aforementioned thickness range (e.g., the minimum thickness of 0.01 mm), the reinforcing member may be broken in response to an external impact and the desired effect of the present disclosure cannot be achieved. When the thickness exceeds the maximum thickness of 1 mm the volume of the electrode assembly is increased. Accordingly, the content of the electrode active material may be reduced throughout the entire electrode assembly and it is difficult to realize a high-capacity electrode assembly.

Figure 2:
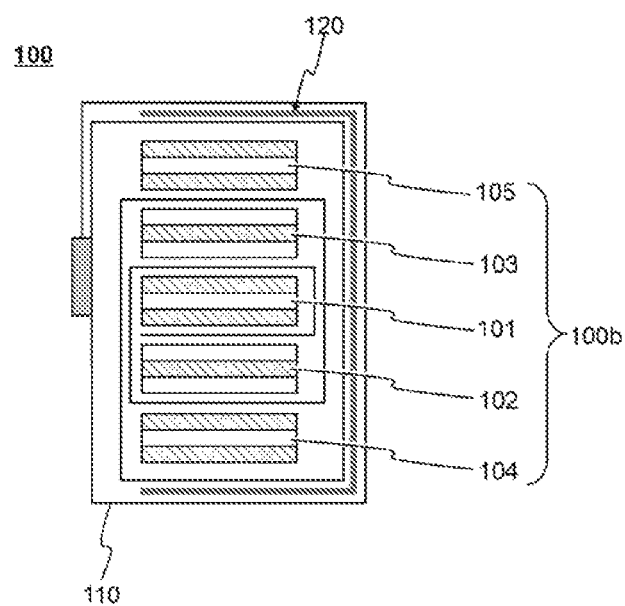

FIG. 1 and FIG. 2 are exemplary schematic diagrams of an electrode assembly according to an exemplary embodiment of the present disclosure. With reference to both FIG. 1 and FIG. 2, the electrode assembly 100 may include a unit cell stack 100b in which five unit cells 101, 102, 103, 104 and 105 are stacked with a separation film 110 interposed therebetween, and a first reinforcing member 120 formed from metal and integrally covers the upper and lower surfaces and one side surface of the unit cell stack 100b to protect the unit cells 101, 102, 103, 104 and 105 against external impacts. Each of the unit cells 101, 102, 103, 104, and 105 may have an A-type bi-cell structure in which a cathode, a separator, an anode, a separator and a cathode are sequentially stacked or a C-type bi-cell structure in which an anode, a separator, a cathode, a separator and an anode are sequentially stacked.

The electrode assembly 100 may include a structure in which the separation film 110 of an arrangement 100a, in which the first unit cell 101 to the fifth unit cell 105 are sequentially disposed on the separation film 110 and then the first reinforcing member 120 is disposed on the separation film 110 to position the reinforcing member 120 proximate to the fifth unit cell 105, is wound from the first unit cell 101 to the first reinforcing member 120 to stack the unit cells 101, 102, 103, 104, and 105. In an exemplary embodiment of the present disclosure, the unit cell stack 100b may be defined as a structure having the separation film 110 wound from the first unit cell 101 to the fifth unit cell 105 to dispose the fifth unit cell 105 and the fourth unit cell 104 at the uppermost and lowermost ends, respectively. Additionally, the electrode assembly 100 may be defined as a structure in which the separation film 100 and the first reinforcing member 120 may be wound on the unit cell stack 100b to cover one side surface and the upper and lower surfaces of the unit cell stack 100b by the first reinforcing member 120.

During the winding, the first reinforcing member 120 may be bent in response to the winding to integrally cover the upper surface, the lower surface and one side surface of the unit cell stack 100b. In this structure, the first reinforcing member 120, together with the separation film 110, may cover one side surface of the unit cells 101, 102, 103, 104 and 105. Additionally, the upper surface of the unit cell stack 100b may be covered while facing the outermost electrode of the fifth unit cell 105 disposed at the uppermost end of the unit cell stack 100b with the separation film 110 interposed therebetween.

Additionally, the first reinforcing member 120 may cover the lower surface of the unit cell stack 100b while facing (e.g. disposed opposite to) the outermost electrode of the fourth unit cell 104 positioned at the lowermost end of the unit cell stack 100b with the separation film 110 interposed therebetween. Although not shown in the drawings, the first reinforcing member 120 may include an insulating material on its surface opposite to a surface in contact with the separation film 110, to provide insulation against the electrodes of the unit cells 101, 102, 103, 104 and 105. The present disclosure may include of an odd number of unit cells (101, 102, 103, 104 and 105). Accordingly, the outermost electrode of the fifth unit cell 105 at the uppermost end and the outermost electrode of the fourth unit cell 104 at the lowermost end may have the same polarity. Additionally, the first reinforcing member 120 may include a pair of fixing tabs 122 and 124, coupled to the cathode tabs or anode tabs of the fourth unit cell 104 and the fifth unit cell 105, respectively.

Figure 3:
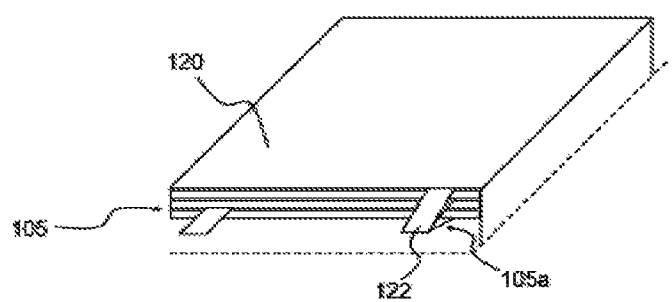

In addition, FIG. 3 is an exemplary schematic that shows an exemplary structure in which the first reinforcing member may be coupled to the electrode tab of the fifth unit cell. With reference to FIG. 3 together with FIG. 1 and FIG. 2, the fixing tab 122 of the first reinforcing member 120 may be connected to the anode tabs 105b of the first unit cell 101. In particular, this structure may fix the first reinforcing member 120 to the unit cell stack 100b. Conversely, although not shown in the drawings, the other fixing tab 124 of the first reinforcing member 120 may be connected to the anode tab 104a of the fourth unit cell 104. Accordingly, the first reinforcing member 120 may be fixed to each of the upper and lower ends of the unit cell stack 100b while electrically connected to the anodes of the fifth unit cell 105 and the fourth unit cell 104 through the fixing tabs 122 and 124.

Figure 4:
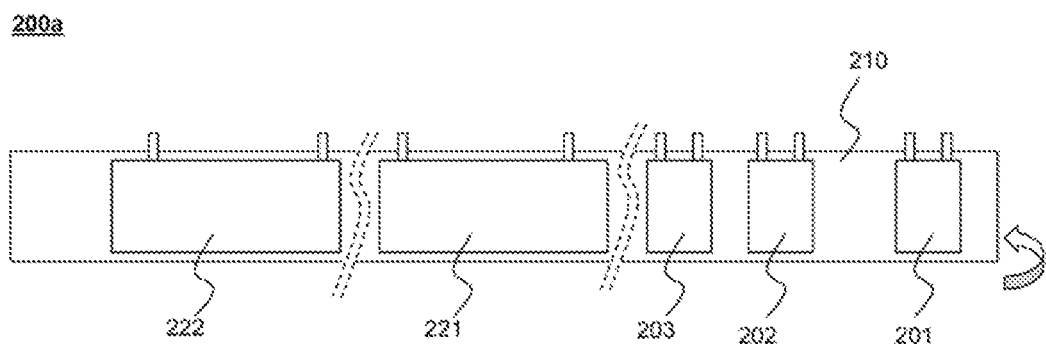
FIG. 4 and FIG. 5 are exemplary diagrams of an electrode assembly according to a second exemplary embodiment of the present disclosure.
Figure 5:
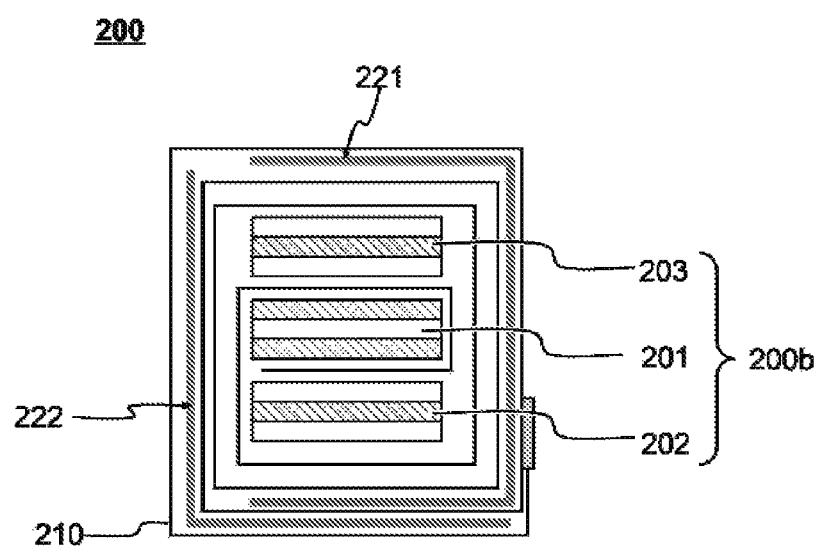

FIG. 4 and FIG. 5 are exemplary schematics that show an electrode assembly 200 according to another exemplary embodiment of the present disclosure. With reference to these drawings, the electrode assembly 200 may include a unit cell stack 200b having three unit cells 201, 202, and 203 stacked with a separation film 210 interposed therebetween and a first reinforcing member 221 and a second reinforcing member 222, formed from metal and cover the unit cell stack 200b to protect the unit cells 201, 202 and 203 against external impacts. The electrode assembly 200 may include a structure having the separation film 210 of an arrangement 200a, in which the first unit cell 201 to the third unit cell 203 are sequentially disposed, the first reinforcing member 221 may be disposed on the separation film 210 to position the first reinforcing member 221 proximate to the third unit cell 203, and the second reinforcing member 222 may be disposed proximate to the first reinforcing member 221, may be wound from the first unit cell 201 to the second reinforcing member 222 to stack the unit cells 201, 202 and 203.

In the present disclosure, the unit cell stack 200b may be defined as a structure in which the separation film 210 is wound from the first unit cell 201 to the third unit cell 203 to dispose the third unit cell 203 and the second unit cell 202 at the uppermost and lowermost ends, respectively. Additionally, the electrode assembly 200 may be defined as a structure in in which the separation film 210 and the first reinforcing member 221 are wound on the unit unit cell stack 200b to cover one side surface and the upper and lower surfaces of the unit cell stack 200b by the first reinforcing member 221, and then the second reinforcing member 222 and the separation film 210 may be wound to cover the other side surface of the unit cell stack 200b and the first reinforcing member 221 portion covering the lower surface of the unit cell stack 200b. In this structure, the first reinforcing member 221 and the second reinforcing member 222 cover both side surfaces of the electrode assembly 200, which allows firmer fixing of the stacked structure. Additionally, when the lower surface of the unit cell stack 200b is covered by two layers, the first reinforcing member 221 and the second reinforcing member 222, this portion may be more effectively protected from external impacts caused by a needle-shaped conductor.

Figure 6:
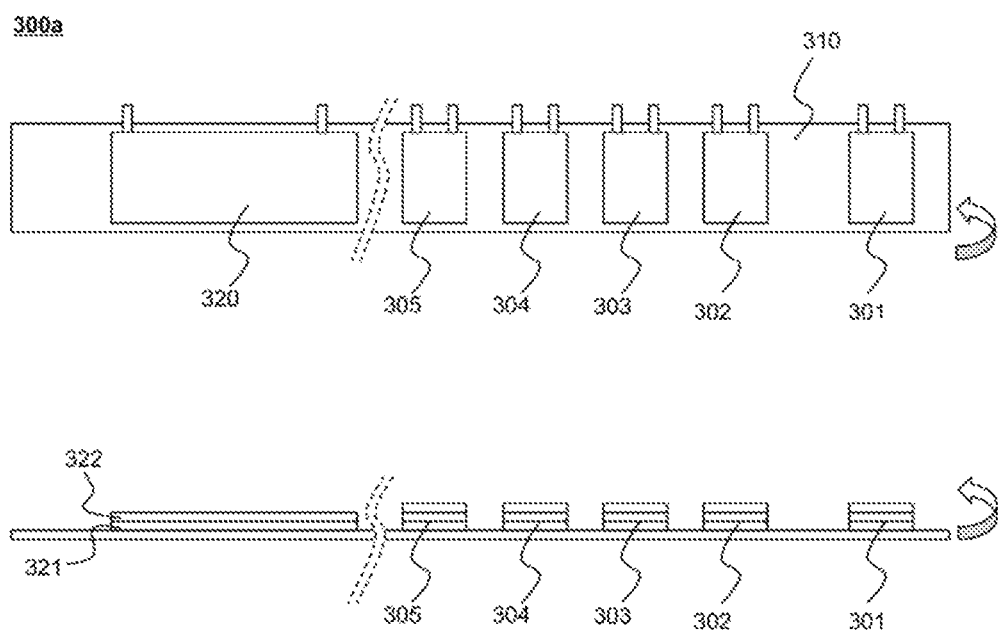
FIG. 6 and FIG. 7 are exemplary diagrams of an electrode assembly according to a third exemplary embodiment of the present disclosure.
Figure 7:
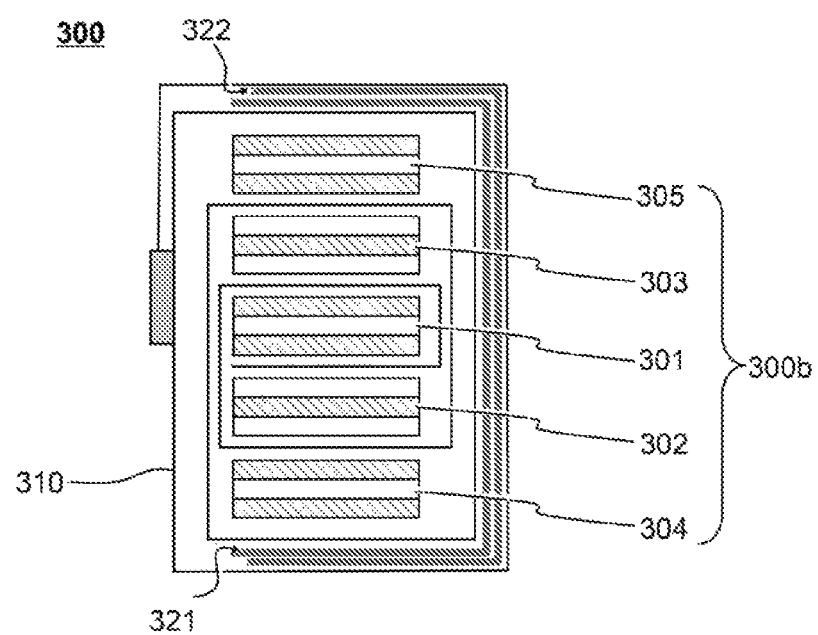

FIG. 6 and FIG. 7 are exemplary schematic diagrams of an electrode assembly 300 according to another exemplary embodiment of the present disclosure. With reference to these drawings, the electrode assembly 300 may include a unit cell stack 300b in which five unit cells 301, 302, 303, 304, and 305 are stacked with a separation film 310 interposed therebetween, and a first reinforcing member 321 and a second reinforcing member 322, formed from of metal and cover the unit cell stack 300b to protect the unit cells 301, 302, 303, 304 and 305 against external impacts.

For example, the electrode assembly 300 may include a structure with a reinforcing member unit 320, having the second reinforcing member 322 stacked on the first reinforcing member 321, is disposed next to the fifth unit cell 305, and then the separation film 310 may be wound to stack the unit cells 301, 302, 303, 304, and 305. Accordingly, the separation film 310 may be wound from the first unit cell 301 to the fifth unit cell 305 to form a unit cell stack 300b in which the fifth unit cell 305 and the fourth unit cell 304 are disposed at the uppermost and lowermost ends, respectively. The separation film 310 and the reinforcing member unit 320 may be wound on the unit cell stack 300b to cover one side surface and the upper and lower surfaces of the unit cell stack 300b by both of the first reinforcing member 321 and the second reinforcing member 322.

The present disclosure also provides a battery cell that may include the electrode assembly. The type of the battery cell of the present disclosure is not particularly limited, but specific examples thereof include a lithium secondary battery having advantages of high energy density and high discharge voltage and output stability, such as a lithium-ion (Li-ion) secondary battery, a lithium polymer (Li-polymer) secondary battery, or a lithium-ion polymer secondary battery. Generally, a lithium secondary battery is composed of a cathode, an anode, a separator, and a non-aqueous electrolyte containing a lithium salt.

The cathode may be prepared, for example, by coating a mixture of a cathode active material, a conductive material and a binder on a cathode current collector and/or an extended current collector, and then drying the resultant. When necessary, a filler may be further added to the mixture. The cathode current collector or the extended current collector are generally made to have a thickness of about 3 to 500 micrometers. The cathode current collector and the extended current collector are not particularly limited as long as they have a high conductivity without causing a chemical change in the battery. Examples thereof may include stainless steel, aluminum, nickel, titanium, baked carbon or aluminum or stainless steel whose surface is treated with carbon, nickel, titanium, silver, etc. The cathode current collector and the extended current collector may have fine irregularities formed on the surface thereof to increase the adhesion to the cathode active material. They may have various shapes such as a film, a sheet, a foil, a net, a porous material, a foam, a nonwoven fabric, etc.

The cathode active material may be a layered compound such as lithium cobalt oxide ($LiCoO_2$) or lithium nickel oxide ($LiNiO_2$) or a compound substituted with one or more transition metals; a lithium manganese oxide such as $Li_{1+x}Mn_{2-x}O_4$ wherein x is 0 to 0.33, $LiMnO_3$, $LiMn_2O_3$, $LiMnO_2$; a lithium copper oxide ($Li_2CuO_2$); a vanadium oxide such as $LiV_3O_8$, $LiFe_3O_4$, $V_2O_5$, $Cu_2V_2O_7$; a Ni-site type lithium nickel oxide represented by the formula $LiNi_{1-x}M_{1-x}O_2$ wherein M=Co, Mn, Al, Cu, Fe, Mg, B or Ga and x=0.01 to 0.3; a lithium manganese composite oxide represented by the formula $LiMn_{2-x}M_xO_2$ wherein M=Co, Ni, Fe, Cr, Zn or Ta and x=0.01 to 0.1 or the formula $Li_2Mn_3MO_8$ wherein M=Fe, Co, Ni, Cu or Zn; $LiMn_2O_4$ in which a part of Li is substituted with an alkaline earth metal ion; a disulfide compound; $Fe_2(MoO_4)_3$, etc., although not limited thereto.

Generally, the content of the conductive material may be about 1 to 30% by weight based on the total weight of the mixture including the cathode active material. The conductive material is not particularly limited as long as it exhibits electrical conductivity without causing a chemical change in the battery. Examples thereof include graphite such as natural graphite or artificial graphite; carbon black such as carbon black, acetylene black, Ketjenblack, channel black, furnace black, lamp black, and summer black; conductive fibers such as carbon fibers and metal fibers; metal powders such as carbon fluoride, aluminum, and nickel powder; conductive whiskey such as zinc oxide and potassium titanate; conductive metal oxides such as titanium oxide; and conductive materials such as polyphenylene derivatives.

The binder may be a component which helps bonding of the active material and the conductive material and bonding to the current collector. The content of the binder may be about 1 to 30% by weight based on the total weight of the mixture including the cathode active material. Examples of the binder include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, etc.

The filler may be an optional component used for inhibiting the expansion of the cathode. The filler is not particularly limited as long as it is a fibrous material that does not cause a chemical change in the battery. Examples thereof include olefin polymers such as polyethylene and polypropylene; fibrous materials such as glass fibers and carbon fibers.

The anode may be manufactured by coating an anode active material on the anode current collector and/or extended current collector and drying the resultant. When necessary, the components as described above may be optionally further added. The anode current collector or extended current collector are generally made to have a thickness of about 3 to 500 micrometers. The anode current collector and extended current collector are not particularly limited as long as they have conductivity without causing a chemical change in the battery. Examples thereof include copper, stainless steel, aluminum, nickel, titanium, baked carbon or copper or stainless steel whose surface is treated with carbon, nickel, titanium, silver, etc., aluminum-cadmium alloys. Also, like the cathode current collector, they may have fine irregularities formed on the surface thereof to increase the adhesion to the anode active material. They may have various shapes such as a film, a sheet, a foil, a net, a porous material, a foam, a nonwoven fabric, etc.

Examples of the anode active material include carbon, such as hard carbon or graphite carbon; a metal composite oxide such as $Li_xFe_2O_3(0 \leq x \leq 1)$, $Li_xWO_2(0 \leq x \leq 1)$, $Sn_xMe_{1-x}Me'_yO$, (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; and a Li—Co—Ni based material.

The separator may be interposed between the cathode and the anode, and an insulating thin film having a high ion permeability and mechanical strength is used therefor. The pore diameter of the separator may be about 0.01 to 10 micrometers, and the thickness thereof may be about 5 to 300 micrometers. The separator uses, for example, chemically resistant and hydrophobic olefin-based polymers, such as polypropylene; and a sheet or a nonwoven fabric made of glass fiber, polyethylene or the like. When a solid electrolyte such such as a polymer is used as the electrolyte, the solid electrolyte may also serve as the separator.

The electrolyte may be a non-aqueous electrolyte containing a lithium salt, composed of a non-aqueous electrolyte and a lithium salt. Examples of the non-aqueous electrolyte include non-aqueous organic solvents, organic solid electrolytes, inorganic solid electrolytes, although not limited thereto. Examples of the non-aqueous organic solvent include aprotic organic solvents, such as N-methyl-2-pyrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing an ionic dissociation group. Examples of the inorganic solid electrolyte include nitrides, halides, and sulphates of Li, such as $Li_3N$, LiI, $Li_5NI_2$, $Li_3N$—LiI—LiOH, $LiSiO_4$, $LiSiO_4$—LiI-LioH, $Li_2SiS_3$, $Li_4SiO_4$, $Li_4SiO_4$—LiI-LioH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide. In addition, the non-aqueous electrolyte may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, or the like, in order to improve charge and discharge characteristics, flame retardancy, etc. In some cases, the non-aqueous electrolyte may further further comprise a halogen-containing solvent, such as carbon tetrachloride and ethylene trifluoride in order to impart incombustibility. Furthermore, in order to improve high-temperature storage characteristics, the non-aqueous electrolyte may further comprise carbon dioxide gas. In addition, fluoro-ethylene carbonate (FEC), propene sultone (PRS), etc. may be further included.

In one specific example, a non-aqueous electrolyte containing a lithium salt may be prepared by adding a lithium salt, such as $LiPF_6$, $LiClO_4$, $LiBF_4$, $LiN(SO_2CF_3)_2$, or the like to a mixed solvent of cyclic carbonate, such as EC or PC, which is a high dielectric solvent, and liner carbonate, such as DEC, DMC, or EMC, which is a low viscosity solvent.

As described above, the reinforcing members may be electrically connected to the unit cells and the electrodes located at the outermost sides of the electrode assembly by virtue of the connection between the fixing tabs and the electrode tabs. Additionally, upon penetration of a needle-shaped conductor, the metallic reinforcing member first contacts the needle-shaped conductor to conduct a current, which may lead to a short circuit of the electrode assembly. However, since the reinforcing member is not coated with an electrode active material, the amount of heat generated by the short circuit is relatively low, and thus the ignition of the electrode assembly due to the needle-shaped conductor penetration can be prevented. In particular, since the electrode assembly has a simple structure in which the reinforcing members are wound together with the separation film as described above, manufacturing cost and process control are improved.

Hereinafter, the present disclosure will be described in further detail with reference to Examples, Comparative Examples and Test Examples. However, these Examples are set forth to illustrate the present disclosure and the scope of the present disclosure is not limited thereto.

EXAMPLES

Example 1

After manufacturing the electrode assembly according to FIG. 1 to FIG. 3, the electrode assembly and an electrolyte were accommodated and sealed in a pouch-shaped battery case of a laminate sheet to manufacture a pouch-shaped battery cell.

Comparative Example 1

The same electrode assembly as that of Example 1 was manufactured except that a reinforcing member was not used. The electrode assembly and an electrolyte were accommodated and sealed in a pouch-shaped battery case of a laminate sheet to manufacture a pouch-shaped battery cell.

Test Example

Each of the battery cells manufactured in Example 1 and Comparative Example 1 were penetrated by a nail with a diameter of 2.5 mm at a speed of 12 m/min and the battery cell was penetrated from the top to the bottom. The battery cell according to the present disclosure, which include a reinforcing member, did not exhibit damage (e.g., combust or catch fire). However, but the battery cell of Comparative Example 1, which did not include a reinforcing member exhibited damage (e.g., caught fire). In particular, the battery cell of Example 1 did not combust because the electrode assembly was first short-circuited by the reinforcing member was not coated with an electrode active material and the temperature of the heat generated by the reinforcing member was relatively low. In contrast, the battery cell of Comparative Example 1 combusted because the needle-shaped conductor directly penetrated the electrode, which caused a short-circuit at the contact portion between the electrode and the needle-shaped conductor. Accordingly, direct conduction of current between the cathode and the anode occurred and created excessive heat generation.

As described above, the electrode assembly according to the present disclosure has a structure capable of minimizing the deformation of the stacked structure of the unit cells or electrodes and the deformation of the electrodes by allowing a reinforcing member made of metal to protect the unit cells from external impacts. Further, upon penetration by a needle-shaped conductor, the electrode assembly allows the metallic reinforcing member to first contact the needle-shaped conductor to conduct current, leading to a short circuit of the electrode assembly. However, since the reinforcing member is not coated with an electrode active material, the amount of the heat generated by the short circuit is relatively low, and the ignition of the electrode assembly due to the needle-shaped conductor penetration is prevented.

While the disclosure has been described with reference to the drawings according to the embodiments thereof, it will be understood by those skilled in the art that various changes and modifications may be made based on the descriptions given herein without departing from the scope of the disclosure.

What is claimed is:

1. An electrode assembly, comprising:
a unit cell stack having n unit cells wound with a separation film interposed therebetween, wherein n is an odd number excluding 1, wherein each unit cell includes a cathode and an anode stacked with a separator interposed therebetween; and
a reinforcing member that is formed from a metal, the reinforcing member disposed at:
at least one of an upper surface and a lower surface of the unit cell stack; and
at least one side surface of the unit cell stack, wherein the reinforcing member is integrally formed as one piece, and
wherein the reinforcing member is disposed on an inner surface of the separation film, wherein the inner surface of the separation film faces toward the unit cells.

2. The electrode assembly according to claim 1, wherein the reinforcing member consists of at least one metal selected from the group consisting of copper, aluminum, nickel, iron, and lead.

3. The electrode assembly according to claim 1, wherein the reinforcing member is a metal plate having a thickness of about 0.1 mm or greater and less than about 1 mm; or a metal thin film having a thickness of about 0.01 mm or greater and less than about 0.1 mm.

4. The electrode assembly according to claim 1, wherein the electrode assembly has a structure having a first unit cell to a nth unit cell sequentially disposed on the separation film, and wherein the reinforcing member is disposed on the separation film to position the reinforcing member proximate to the nth unit cell of the arrangement, and then the separation film is wound to stack the unit cells.

5. The electrode assembly according to claim 4, wherein the separation film is wound from the first unit cell to the nth unit cell to form a unit cell stack to position the nth unit cell and the (n−1)th unit cell at an uppermost end and a lowermost end, respectively, and wherein the separation film and the reinforcing member are wound on the unit cell stack to cover the side surface, the upper surface and the lower surface of the unit cell stack by the reinforcing member.

6. The electrode assembly according to claim 5, wherein the reinforcing member and the separation film covers the side surface of the unit cells.

7. The electrode assembly according to claim 5, wherein the reinforcing member covers the upper surface of the unit cell stack and is positioned opposite the outermost electrode of the nth unit cell disposed at the uppermost end of the unit cell stack.

8. The electrode assembly of claim 7, wherein the electrodes of the first unit cell and the (n−1)th unit cell are disposed opposite to the reinforcing member and have the same polarity as each other.

9. The electrode assembly according to claim 5, wherein the reinforcing member covers the lower surface of the unit cell stack and is positioned opposite to the outermost electrode of the (n−1)th unit cell disposed at the lowermost end of the unit cell stack.

10. The electrode assembly of claim 9, wherein the electrodes of the first unit cell and the (n−1)th unit cell are disposed opposite to the reinforcing member and have the same polarity as each other.

11. The electrode assembly according to claim 5, wherein the reinforcing member further comprises an insulating material disposed on a surface opposite to a surface in contact with the separation film, to provide insulation against the electrodes of the unit cells.

12. The electrode assembly according to claim 5, wherein the reinforcing member is bent in response to winding and integrally covers the upper surface, the lower surface, and the side surface of the unit cell stack.

13. The electrode assembly according to claim 4, wherein a second reinforcing member is disposed proximate to the first reinforcing member and the separation film is wound and the unit cells are stacked.

14. The electrode assembly according to claim 13, wherein the second reinforcing member is formed of a metal material different from the metal of the first reinforcing member.

15. The electrode assembly according to claim 13, wherein:
the separation film is wound from the first unit cell to the nth unit cell to form a unit cell stack having the nth unit cell and the (n−1)th unit cell disposed at the uppermost end and the lowermost end, respectively;
the separation film and the first reinforcing member are wound on the unit cell stack to allow the the first reinforcing member to cover the side surface, the upper surface and the lower surface of the unit cell stack; and
the second reinforcing member and the separation film are wound to cover a second side surface of the unit cell stack and the first reinforcing member portion that covers the upper surface or the lower surface of the unit cell stack.

16. The electrode assembly according to claim 4, wherein a reinforcing member unit, having a second reinforcing member stacked on the first reinforcing member, is proximate to the nth unit cell and the separation film is wound to stack the unit cells.

17. The electrode assembly according to claim 16,
wherein the separation film is wound from the first unit cell to the nth unit cell to form a unit cell stack having the nth unit cell and the (n−1)th unit cell disposed at the uppermost and lowermost ends, respectively; and
wherein the separation film and the reinforcing member unit are wound on the unit cell stack having the first reinforcing member and the second reinforcing member to cover one side surface and the upper and lower surfaces of the unit cell stack.

18. The electrode assembly according to claim 4, wherein the reinforcing member has a pair of fixing tabs coupled to the cathode tabs or anode tabs of the unit cells and have the same polarity as the fixing tabs, to fix the reinforcing member, and wherein a first fixing tabs is coupled to the cathode tabs or the anode tabs formed in the nth unit cell, and a second fixing tab is coupled to the cathode tabs or the anode tabs formed in the (n−1)th unit cell.

* * * * *